(No Model.)

C. G. CAPWELL.
DENTAL SEPARATOR.

No. 600,257.   Patented Mar. 8, 1898.

Witnesses:
A. C. Harmon.
Fred S. Greenleaf.

Inventor.
Courtland G. Capwell.
by Crosby & Gregory
Attys.

UNITED STATES PATENT OFFICE.

COURTLAND G. CAPWELL, OF BOSTON, MASSACHUSETTS.

DENTAL SEPARATOR.

SPECIFICATION forming part of Letters Patent No. 600,257, dated March 8, 1898.

Application filed July 14, 1897. Serial No. 644,485. (No model.)

*To all whom it may concern:*

Be it known that I, COURTLAND G. CAPWELL, of Boston, in the county of Suffolk and State of Massachusetts, have invented an Improvement in Dental Separators, of which the following description, in connection with the accompanying drawings, is a specification, like letters on the drawings representing like parts.

This invention has for its object the production of a simple and powerful device for separating two adjacent teeth, in order that the operator may have a more unobstructed field in which to work.

Figure 1:
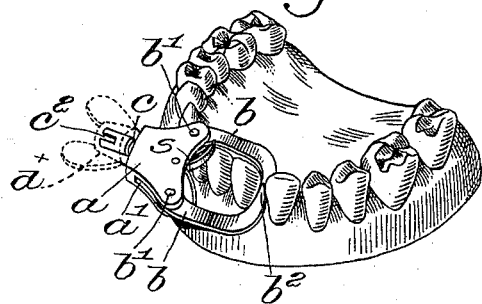
Figure 2:
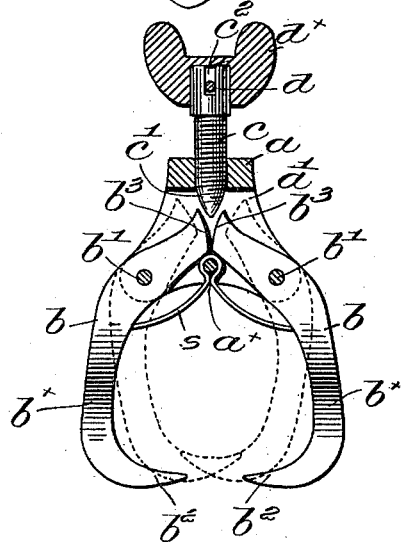
Figure 3:
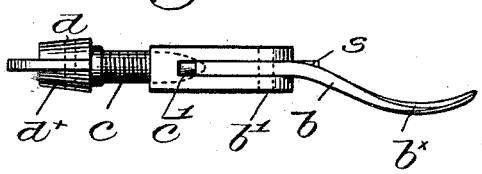
Figure 4:

Figure 1 is a perspective view of a dental separator in use, the actuator being shown in dotted lines. Fig. 2 is a greatly-enlarged view of the separator, the holder and actuator being shown in section. Fig. 3 is a side elevation of the device with the actuator in place, and Fig. 4 is an end view of the actuator detached.

I have herein shown the separator as composed of a holder $a$, transversely slotted at $a'$ to receive the inner ends of two separating-jaws $b$, fulcrumed on the holder, near their inner end, at $b'$, the outer ends of the jaws being curved and turned toward each other. The outer extremity of each jaw is wedge-shaped, as at $b^2$, to enter between the two teeth to be separated, while the inner ends of the jaws are shaped to present two opposed cam-surfaces $b^3$, Fig. 2. A spreader is mounted in the holder, said spreader being shown as a threaded stud $c$, having a conical inner end $c'$ to enter between and separate the cam ends $b^3$ of the jaws and thereby force their wedge-shaped tips $b^2$ toward each other. The spreader is moved in or out of the threaded hole in the holder by rotation and acts to lock the jaws in adjusted position.

I have herein shown the outer end of the spreader as transversely slotted or notched at $c^2$ to be entered by a pin $d$ in a recess $d'$ of the detachable actuator, shown as a suitable nut or thumb-piece $d^\times$. The actuator is applied as shown in the drawings, and rotation thereof will actuate the spreader. After the jaws are adjusted the actuator is withdrawn, and the operator is not incommoded by its presence in the mouth of the patient. The jaws are curved in the direction of their length, as at $b^\times$, Fig. 3, to better adapt them to their work.

A suitable leaf-spring $s$, mounted on a lug $a^\times$ on the holder in front of the fulcra of the jaws, acts normally upon the jaws to separate their outer ends as the spreader is withdrawn.

Having fully described my invention, what I claim, and desire to secure by Letters Patent, is—

1. In a dental separator, a holder, two jaws having wedge-like outer ends, independently pivoted on said holder near their inner ends, and means to act upon the inner ends of and swing said jaws upon their pivots.

2. In a dental separator, a holder, two separating-jaws fulcrumed thereon and having adjacent cam-shaped inner ends, a rotatable threaded spreader mounted on and to move longitudinally in the holder to act upon and force said inner ends of the jaws apart, and a detachable actuator to rotate and thereby move the spreader longitudinally.

3. In a dental separator, a holder, two inwardly-curved wedge-like separating-jaws independently pivoted thereon and adapted at their outer ends to enter from opposite sides between the teeth to be separated, and a spreader carried by and longitudinally movable in the holder to separate the inner ends of the jaws.

4. In a dental separator, a holder, two inwardly-curved wedge-like separating-jaws pivoted thereon and adapted at their outer ends to enter at opposite sides between the teeth to be separated, a threaded spreader carried by and longitudinally movable in the holder, to separate the inner ends of the jaws, and a spring on the holder, the free ends of the spring bearing upon the jaws between their fulcra and outer ends to open them.

In testimony whereof I have signed my name to this specification in the presence of two subscribing witnesses.

COURTLAND G. CAPWELL.

Witnesses:
JOHN C. EDWARDS,
AUGUSTA E. DEAN.